United States Patent [19]

Nickel et al.

[11] 4,078,640

[45] Mar. 14, 1978

[54] FORAGE WAGON INCLUDING APPARATUS FOR DISENGAGING DRIVEN PARTS

[75] Inventors: Joseph S. Nickel, Saukville; Dean E. Seefeld, West Bend, both of Wis.

[73] Assignee: Gehl Company, West Bend, Wis.

[21] Appl. No.: 745,220

[22] Filed: Nov. 26, 1976

[51] Int. Cl.² .............................................. F16D 3/44
[52] U.S. Cl. ...................................... 192/25; 192/22; 192/29
[58] Field of Search .................... 192/24, 25, 67 R, 22

[56] References Cited

U.S. PATENT DOCUMENTS

| 1,872,132 | 8/1932 | Falleson | 192/25 |
| 2,529,247 | 11/1950 | Erler | 192/25 |
| 2,901,068 | 8/1959 | Tipper | 192/25 |
| 3,206,212 | 9/1965 | Wallace et al. | 192/22 |
| 3,276,554 | 10/1966 | Kasten | 192/29 |

Primary Examiner—John J. Camby
Assistant Examiner—Henry C. Yuen
Attorney, Agent, or Firm—James E. Nilles

[57] ABSTRACT

A forage wagon or the like having components driven by a power take-off shaft and including apparatus for selectively disengaging the power take-off shaft and the driven parts. The disengaging apparatus includes a safety clutch having a circular drive clutch plate supported on a drive shaft of a power take-off shaft for rotation with the drive shaft and a driven circular clutch plate freely rotatably supported on the drive shaft. The driven clutch plate functions to drive the various driven parts of the forage wagon. In the normal operating condition, a drive pin, aligned parallel to the axis of the drive shaft, is received through bores in both the drive plate and the driven plate such that the driven plate rotates with the drive plate. The drive pin supports a cam pin which is received in slideable engagement against a camming surface and engageable with a trip lever which can cause sliding movement of the cam pin relative to the camming surface and consequent axial movement of the drive pin out of engagement with the driven plate thereby disengaging the drive plate and the driven plate. A further aspect of the invention includes an actuating assembly providing a secondary safety means responsive to actuation of the safety clutch and for causing disengagement of a second clutch controlling operation of the forage wagon driven beaters and main conveyor.

8 Claims, 10 Drawing Figures

FORAGE WAGON INCLUDING APPARATUS FOR DISENGAGING DRIVEN PARTS

BACKGROUND OF THE INVENTION

1. Field of the Invention

The present invention relates generally to forage wagons and other machines of the type which include driven components such as beaters, conveyors, or other mechanisms driven by a power take-off shaft. More particularly, the invention relates to safety clutches which can be used in forage wagons or the like and which provide means to interrupt the power to driven parts of the forage wagon whenever necessary and further relates to secondary safety means for also interrupting power transmission to the forage wagon driven beaters and main conveyor in response to actuation of the safety clutch.

2. Description of the Prior Art

In forage wagons or similar machines of the type which include power driven parts such as rotatable beaters and chain driven conveyors and which are powered by means of a rotating power take-off shaft or drive shaft extending from the towing vehicle, in the interests of the safety of the operator, it is desirable to have a means for immediately disconnecting the power input to the forage wagon and to provide means to quickly stop the various driven components of such vehicles. Safety clutches commonly used in such forage wagons are shown for example in the patent to Kasten, U.S. Pat. No. 3,276,554 issued Oct. 4, 1966 and in the patent to Janssen, U.S. Pat. No. 3,161,269 issued Dec. 15, 1964. The Janssen patent is assigned to an assignee in common with that of the present invention.

SUMMARY OF THE INVENTION

The present invention includes an improved safety clutch which can be used on a forage wagon or the like to provide an improved simplified, more reliable and more effective safety clutch to interrupt power input from the power take-off shaft to the forage wagon, and further includes a means for use in combination with the safety clutch and for simultaneously causing disengagement of a secondary clutch mechanism, which is functional to disengage power applied to the forage wagon beaters and main conveyor, upon actuation of the safety clutch thereby providing an additional safety feature increasing the reliability of the mechanism.

The safety clutch mechanism is generally comprised of a circular drive plate assembly mounted on a drive shaft for rotation with the drive shaft, the drive shaft being driven by the power take-off shaft of a towing vehicle. A driven plate assembly is also supported on the drive shaft but rotatable with respect to the shaft. The driven plate assembly includes drive sprockets which function to drive chains, in turn providing power to the various driven parts of the forage wagon such as the beaters and conveyors. The driven plate assembly also includes a driven plate which is received in side-by-side parallel engagement with a drive plate of the drive plate assembly and releasably engaged by an axially moveable drive pin, which in normal operation is intended to cause rotation of the driven plate with the drive plate. The drive pin is axially slideably supported in aligned bores in the drive plate assembly and includes a projecting end which can extend into one of a plurality of slots in the driven plate to drive the driven plate. The drive pin is spring biased into engagement with one of the dots and includes a radially outwardly extending cam pin secured to its end opposite that received in the slots of the driven plate. The cam pin is slideably received against a camming surface such that axial rotation of the drive pin and consequent arcuate sliding movement of the cam pin with respect of the camming surface causes the drive pin to move axially and out of engagement with the slots in the driven plate. The safety clutch mechanism also includes a pivotable trip lever selectively engageable with the cam pin to cause relative rotation of the drive pin and its withdrawal from driving engagement with the driven plate. The trip lever is spring biased toward a cam pin engaging position but is held in a retracted position by a releasable latch attached to an actuating rod in turn connected to a safety bar of a forage wagon or some other trip mechanism of a similar vehicle. Actuation of the safety bar causes upward movement of the actuator rod and causes the releasable latch to permit the trip lever to move toward a cam pin engaging position. Rotation of the drive plate assembly upon the drive shaft brings the end of the cam pin into engagement with the trip lever and continued rotation of the drive plate assembly results in rotation of the drive pin around its axis and disengagement of the drive pin from the driven plate. The trip lever assembly also includes a manual override means for moving the trip lever to a cam pin engaging position even if the biasing spring fails.

The safety clutch mechanism has a substantial advantage over the prior art devices in that its structure is less complicated than the other devices and is consequently more reliable and less expensive. A further advantage is that the axially moveable drive pin, being receivable within a bore in the driven plate assembly, provides a positive connection between the drive plate and the driven plate which cannot slip and which is not subjected to any appreciable wear. Furthermore, once the drive pin has been rotated to a disengaged position such that the drive plate and the driven plate move independently, the cam pin is received within a detent in the camming surface and is secured therein by the force of a compression spring thereby preventing rotation of the drive pin back to its original position and providing means for positively disengaging the drive means and precluding the possibility of only partial disengagement of inadvertant re-engagement of the drive assembly. To permit continued operation of the forage wagon, the cam pin must be manually moved back to its original position.

The trip lever assembly also provides advantages over the previously used safety clutch devices in that the trip lever is spring biased toward an engaging position with the cam pin and a mere release of the latch securing the trip lever will cause movement of the trip lever to an engaging position and the declutching cycle will automatically continue once the latch has been tripped. The trip lever assembly also includes a means for moving the trip lever to the cam pin engaging position in the event of failure of the trip lever biasing spring.

A further advantage of the safety clutch is that the motion and forces of the rotating drive plate and drive shaft are used to cause rotation of the drive pin and consequent decoupling of the drive plate and the driven plate. Furthermore, each of the components provided for declutching have rotating relationships rather than sliding relationships. Therefore, the decoupling action is more positive than would be provided by a mechanism having sliding components.

Finally, by providing multiple slots in the driven plate assembly, and by providing spring biasing means for urging the drive pin toward the driven plate, repositioning of the drive pin within the slots of the driven plate can be accomplished by merely rotating the cam pin to its proper position and then rotating the drive plate assembly until the drive pin snaps into a slot of the driven plate.

An additional aspect of the invention is that the safety bar of the forage wagon is also operably connected to a second clutch mechanism which is operable to control the beater drive and the apron conveyor drive, and such that in the event the safety bar is caused to pivot about its axis thereby causing disengagement of the safety clutch mechanism, movement of the safety bar will also cause actuation of the second or beater clutch mechanism thereby stopping the beaters and main conveyor even if the safety clutch mechanism fails.

The secondary or beater clutch mechanism is also constructed such that it can be manually activated and as a further safety feature, the beater clutch mechanism must be manually reset after the safety clutch mechanism has been reset in order to provide power input to the beaters and conveyor.

Other advantages of the present invention will become more apparent with reference to the following description of a preferred embodiment of the invention.

DESCRIPTION OF THE PREFERRED EMBODIMENT

Figures 1, 2A:
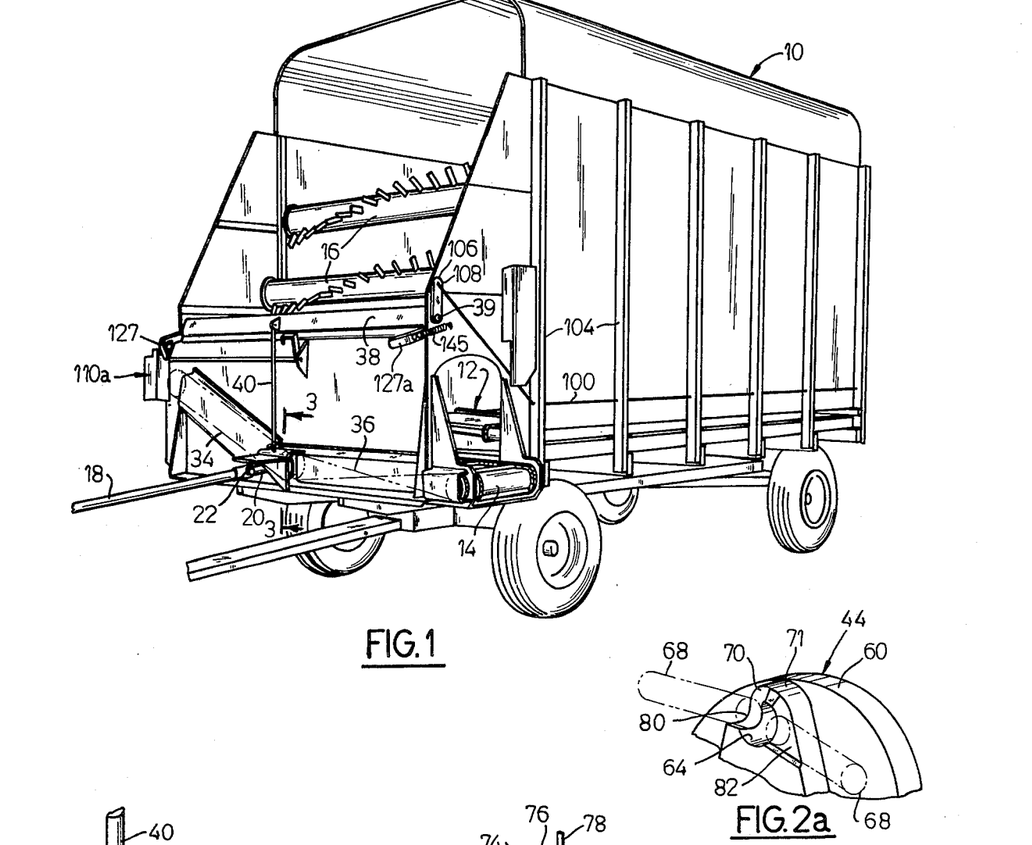
FIG. 1 is a perspective view of a forage wagon embodying the present invention.
FIG. 2a is an enlarged perspective view of the camming surface shown in FIG. 2 and showing the cam pin supported against the camming surface.
Figure 2:
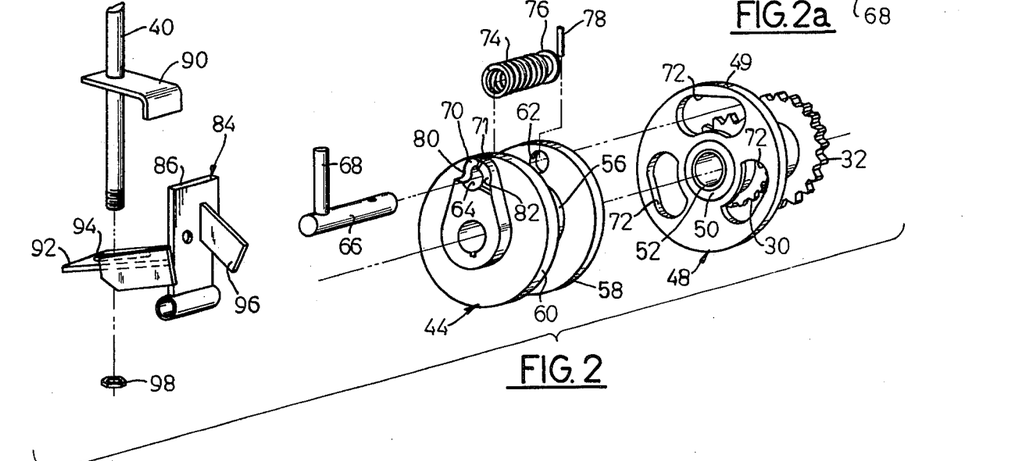
FIG. 2 is an exploded perspective view of components of the safety clutch shown in FIG. 3.
Figure 3:
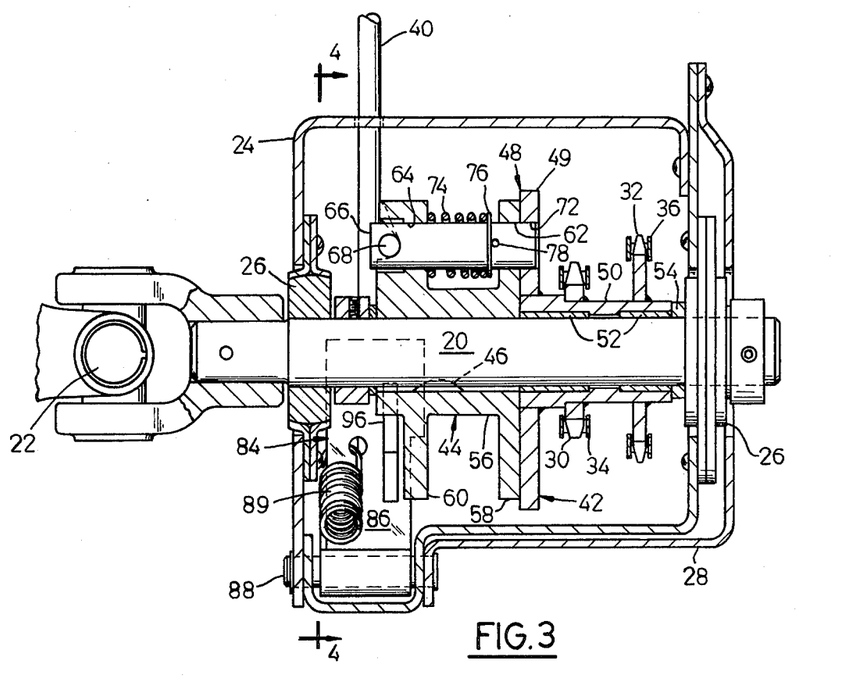
FIG. 3 is an enlarged cross-sectional view of the safety clutch of the invention and taken generally along line 3—3 in FIG. 1.

The forage wagon 10 shown in FIG. 1 comprises, in part, a support means, and includes power driven components such as an apron conveyor 12, a discharge conveyor 14, and one or more beaters 16. Power for driving each of these components is provided by a power take off shaft 18, connectable to a towing vehicle (not shown), and a rotatable drive shaft 20 journalled to the take off shaft 18 by a universal joint 22. The drive shaft 20 is rotatably supported in a clutch housing 24 (FIG. 3) by means of bearing assemblies 26. The clutch housing is in turn supported by a frame element 28 of the forage wagon. Power is transmitted from the drive shaft 20 to the various driven components 12, 14, and 16 by a pair of sprockets 30 and 32 operably connected to the driven components by chains 34 and 36.

A pivotable safety bar 38 extends across the front end of the forage wagon, the safety bar 38 being supported by a laterally extending shaft 39 pivotably supported at its opposite ends by the sides of the forage wagon. The safety bar is connected by means of a vertically extending actuator rod 40 to safety clutch 42 in order to cause disengagement or declutching in the event that an object strikes the safety bar 38 causing it to pivot and causing the actuator rod 40 to be pulled upwardly.

The safety clutch 42 is comprised of a drive plate assembly 44 which is received on the drive shaft 20 and secured thereto by a key 46. The drive plate assembly 44 is thus rotatably driven with the drive shaft 20. The safety clutch 42 also includes a driven plate assembly 48 rotatably supported on the drive shaft 20. The driven plate assembly 48 is comprised of a circular driven plate 49 rigidly supported by a sleeve 50. The sleeve 50 is supported for rotation about the drive shaft 20 by a pair of bushings 52 and is maintained in spaced relationship from the bearing 26 by a spacer 54. The sleeve 50 also rigidly supports the sprockets 30 and 32 such that rotation of the driven plate 49 and sleeve 50 causes rotation of the sprockets 30 and 32.

The drive plate assembly 44 is comprised of a spool-like structure including a hub portion 56, a circular drive plate 58 integrally supported by the hub portion and a parallel, axially spaced disc 60 also integrally supported by the hub portion 56. The drive plate 58 and the spaced disc 60 include aligned bores 62 and 64, respectively, adjacent their peripheral edges for slideably supporting a drive pin 66. The drive pin 66 is axially slideably received in the bores 62 and 64 such that its axis is parallel to, and spaced from, the axis of the drive shaft 20.

The drive pin 66 is resiliently biased toward the driven plate 49 by a coil spring 74 positioned around the drive pin 66 and compressed between the disc 60 and a washer 76 which surrounds the drive pin 66 and is axially secured by a transverse pin 78.

Figure 4:
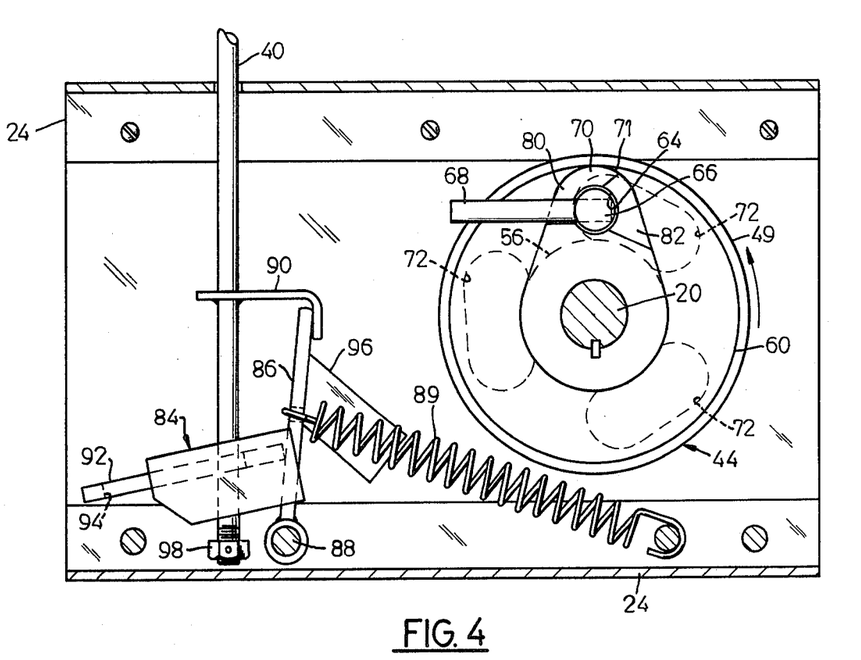
FIG. 4 is a cross-sectional view taken along line 4—4 in FIG. 3 and showing the safety clutch in a normal operating position with the trip lever retracted.
Figure 6:
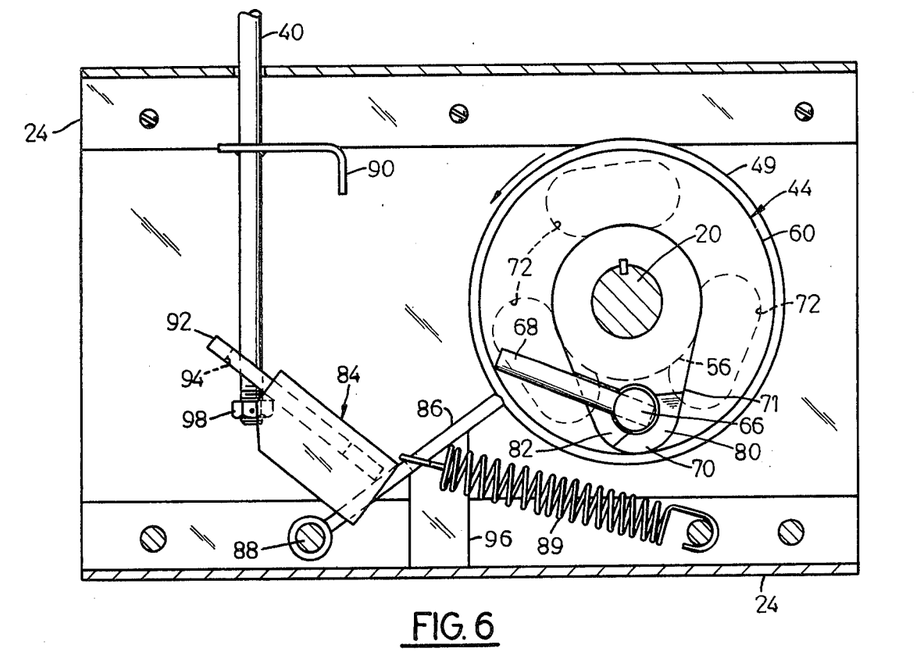
FIG. 6 is a view similar to FIGS. 4 and 5 but with the cam pin and drive pin rotated to a position wherein the drive pin is retracted from the driven plate such that the driven plate is permitted to move independently of the drive plate.

The drive pin 66 rigidly supports a radially outwardly extending projection or cam pin 68 at its end adjacent to the disc 60. The cam pin 68 is intended to be received in resiliently biased, sliding engagement against a camming surface 70 of a cam or lobe 71 comprising an integral portion of disc 60. The camming surface 70 has the particular configuration that when the cam pin 68 is in the position shown in FIG. 4, the end of the drive pin 66 opposite the cam pin 68 is received in driving engagement (FIG. 3) within one of the three elongated slots or bores 72 around the periphery of the driven plate 49, and when the cam pin 68 is in the position shown in FIG. 6, the drive pin 66 is axially retracted away from the driven plate 49 such that its end is not engaged within the slots 72. When the driving pin 66 has been retracted, the driven plate assembly 48 is then freely rotatable with respect to the drive plate 58 and the drive shaft 20. The cam 71 is more clearly shown in FIG. 2a as including a camming surface 70 disposed between detents or depressions 80 and 82 functional to releaseably engage the cam pin 68 in the positions assumed by the cam pin as shown in FIGS. 4 and 6, respectively. The coil spring 74 resiliently biases the cam pin 68 such that the cam pin will not move out of the depressions 80 or 82 unless a substantial force is applied to the end of the cam pin.

Figure 5:
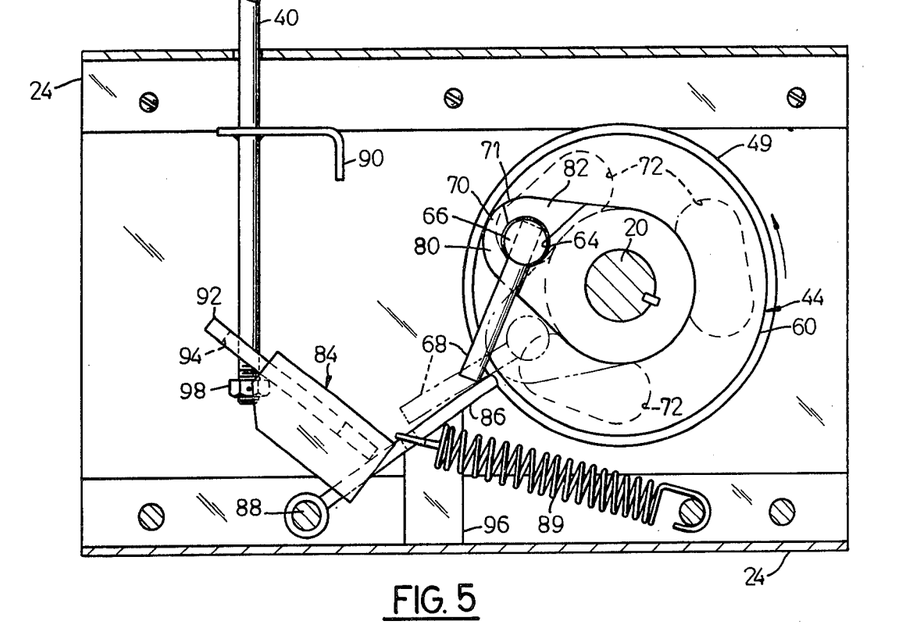
FIG. 5 is a view similar to FIG. 4 but showing the trip lever in a position wherein it engages the cam pin of the drive pin.

During normal operation, the cam pin 68 is positioned as shown in FIG. 4 and is releaseably secured within the depression 80 of the cam 71. As also shown in FIG. 4, a trip lever assembly 84 is secured in spaced relationship from the cam pin 68 such that the cam pin is rotatable with drive shaft 20 without interference from the trip lever assembly 84. The trip lever assembly 84 is comprised of a trip lever 86 pivotably supported by pivot pin 88 for movement from a retracted position as shown in FIG. 4, to a cam pin engaging position as shown in FIG. 5. A coil spring 89 is connected at one end to the clutch housing 24 and at its other end to the trip lever 86 to resiliently bias the trip lever 86 toward the engaging position. The trip lever is maintained in its retracted or disengaged position by a latch 90 rigidly secured to the actuator rod 40. The trip lever assembly 84 also includes a bracket 92 rigidly secured thereto and including a slot 94 for slideably receiving the lower end of the actuator rod 40. The trip lever 86 is also provided with a rigid stop 96 which is receivable against the clutch housing 24 and functions to limit the extent of angular movement of the trip lever.

Operation

In operation, in the event the safety bar is activated and pivoted, the actuator rod 40 and the latch 90 move upwardly. The trip lever assembly 84 is thus released and the spring 89 functions to pivot it to the cam pin engaging position shown in FIG. 5. In the event the spring 89 has been damaged and rendered inoperative, upward movement of the actuator rod 40 will cause the nut 98, threadably secured to its lower end, to be received against the bracket 92 thereby providing a positive secondary means for causing the trip lever 86 to be pivoted to its engaging position.

The drive pin 66 and cam pin 68 rotate with the drive shaft 20 and drive plate assembly 44 such that the radial outer end of the cam pin 68 will be brought into contact with the end of the trip lever 86 as shown in FIG. 5. The continued rotation of the drive plate assembly 44 as shown in FIGS. 5 and 6 will then cause arcuate movement of the cam pin 68 relative to the axis of the drive pin 66 and a sliding movement of the cam pin 68 with respect to the camming surface 70. The drive pin 66 will thus be forced axially away from the driven plate 49 and out of engagement with slots 72 such that the driven plate assembly 48 will be freely rotatable with respect to the drive shaft 20 and drive plate 58.

When it is desired to re-engage the drive pin 66 with the slots 72, the trip lever 86 is pivoted to its original position and secured by the latch 90. The cam pin 68 is then used to manually rotate the drive pin 66 until the cam pin 68 is positioned as shown in FIG. 4 and the drive plate assembly is rotated until the drive pin 66 is aligned with a slot 72 wherein the compression spring 74 will force the drive pin 66 into engagement with that slot 72.

Secondary Safety Mechanism

Figure 7:
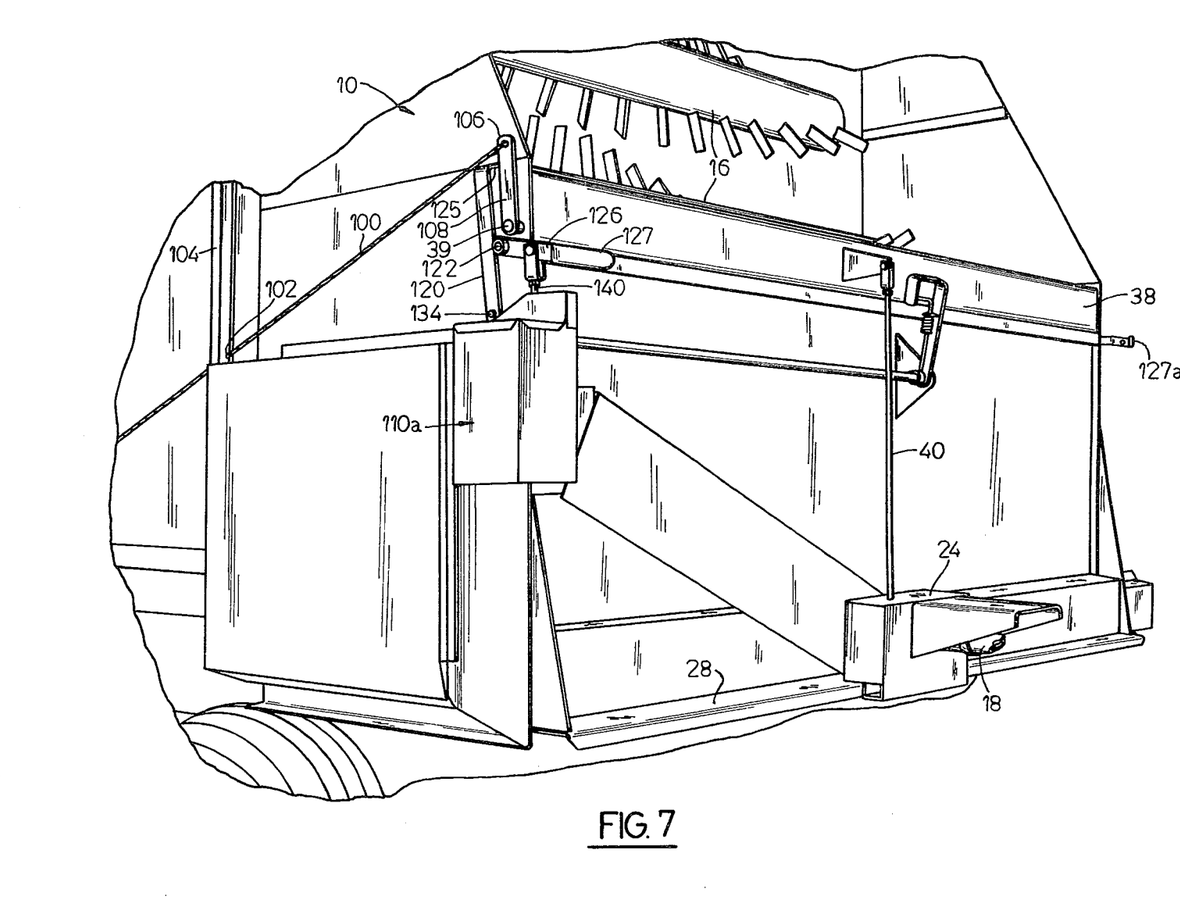
FIG. 7 is a partial perspective view of the forage wagon shown in FIG. 1 and illustrating the clutch engaging linkage of the secondary clutch assembly.

The safety bar 38 extending across the front end of the forage wagon 10 can also be caused to pivot about the shaft 39, to thereby cause actuation of the safety clutch 42, by trip cords 100 which extend along both sides of the forage wagon. The trip cords 100 are freely supported within holes 102 (FIG. 7) in the vertical frame members 104 and have one of their ends tied to the projecting end 106 of levers 108 which are rigidly attached by welding or the like to opposite ends of the shaft 39 which supports the safety bar 38. The ends of the trip cords 100 opposite the ends secured to the levers 108 are secured to the read portions of the forage wagon 10. Thus, by pulling on one of the trip cords 100 the operator can cause the safety bar 38 to pivot about the shaft 39 thereby pulling upwardly on the vertically extending actuator rod 40 and causing disengagement of the safety clutch 42 in the manner previously described. The advantage of this arrangement is that the operator can thus cause disengagement of the driven members of the forage wagon from nearly any position around the forage wagon.

Figure 8:
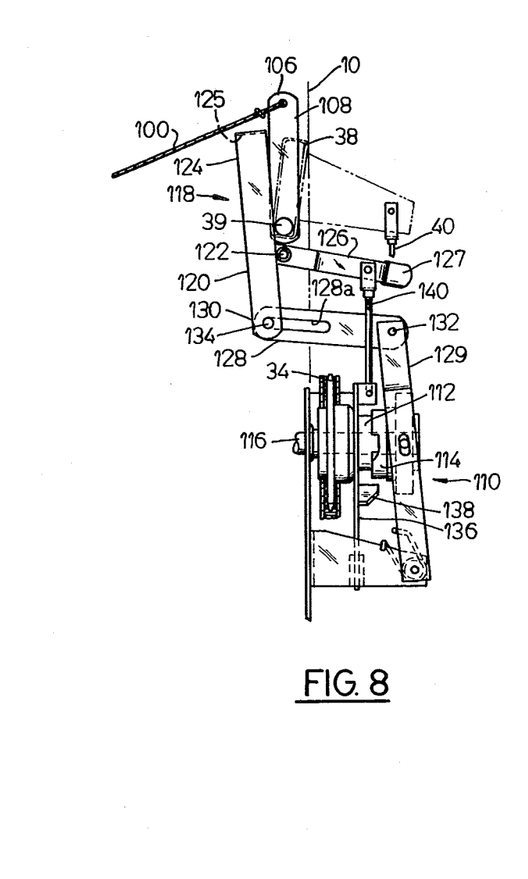
FIG. 8 is an enlarged side elevation view of the secondary clutch assembly shown in part in FIG. 7.
Figure 9:
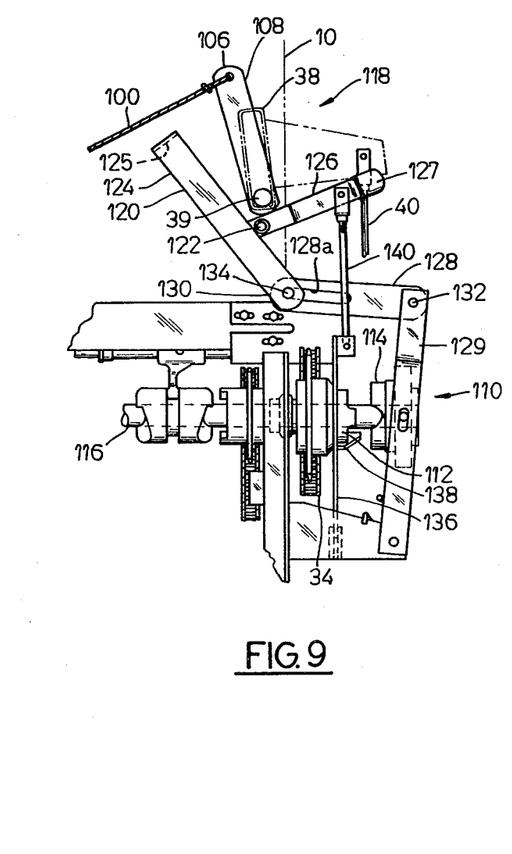
FIG. 9 is a view similar to FIG. 8 but showing the secondary clutch assembly in a clutch disengaging position.

The apparatus of the invention also includes a secondary safety mechanism functional upon pivotal movement of the safety bar 38 to disengage the beater drive mechanism and the conveyor drive mechanism of the forage wagon 10. The beaters 16 and the apron conveyor 12 of the forage wagon 10 are driven by the drive chain 34 (FIG. 1), in a known manner and described in detail in U.S. Pat. No. 3,804,279, issued Apr. 16, 1974 to Braunberger et al and assigned to an assignee in common with that of the present invention. The beater and apron conveyor drive mechanism is shown in FIGS. 8 and 9 as including a secondary clutch assembly 110, disposed within housing 110a shown in FIGS. 1 and 7, the secondary clutch assembly a disengageable clutch 110 having a drive clutch plate 112 driven by the drive chain 34 and a driven clutch plate 114 engageable with the drive clutch plate 112 for rotation therewith and rigidly connected to a shaft 116 functional to rotate the drive mechanism of the beaters 16 and the conveyor 12 in the manner shown in the Braunberger patent cited above. A secondary clutch actuating assembly 118 is operably connected to the secondary clutch assembly 110 to cause engagement and disengagement of the secondary clutch assembly 110 in a manner to be described and is operable in response to pivotal movement of the safety bar 38 to cause disengagement of the secondary clutch assembly 110 at the same time that the safety clutch 42 is cause to disengage.

The secondary clutch actuating assembly 118 includes a bell crank 120 which is pivotably mounted for rotation about a shaft 122, in turn supported by the side wall of the forage wagon 10. It will be noted that the shaft 122 has an axis of rotation closely adjacent to and parallel the axis of the shaft 39 supporting the safety bar 38. The bell crank 120 includes a lever 124 and a clutch actuating linkage comprised of a generally perpendicularly extending bell crank arm 126 rigidly connected to the bell crank lever 124 intermediate its ends. The bell crank lever 124 includes an extending end which is shown in FIG. 8 as being receivable adjacent and generally parallel to the lever 108.

The clutch assembly 110 includes a yoke 129 which is operably connected to the driven clutch plate 114 for causing movement of the driven clutch plate 114 toward and away from the drive clutch plate 112. The yoke 129 is pivotably supported by a pivot pin at its lower end and is connected by a link 128 to the lower end 130 of the bell crank lever 124. The link 128 is attached to the yoke 129 by means of a pivot pin 132 and includes a slot 128a extending longitudinally in its end opposite the pivot pin 132 for receiving a sliding pin 134 supported by the lower end of the bell crank lever 124. The clutch assembly 110 also includes a generally vertically extending plate 136 having a projecting lug 138 vertically reciprocably movable with the plate 136 and functional to cause disengagement of the drive clutch plate 112 and the driven clutch plate 114 in a manner described in the Braunberger patent cited above. Vertical movement of the plate 136 and the lug 138 is caused by a tie rod 140 attached by means of a pivot pin to the plate 136 and attached at its upper end to the perpendicularly extending arm 126 of the bell crank.

Secondary Clutch Actuating Assembly Operation

In operation and in the event that the safety bar 38 is caused to pivot about the shaft 39 due to either pivotal movement of the safety bar 38 itself or due to pulling on the trip cords 100 to cause the lever 108 to cause pivotal movement of the safety bar 38, the lever 108 which strikes a projecting tab 125 of the bell crank lever 124 can cause pivotal movement of the bell crank 120 about the shaft 122 from the position shown in FIG. 8 to the position shown in FIG. 9. Such pivotal movement of the bell crank 120 will cause the extending arm 126 of the bell crank 120 to pull upwardly on the tie rod 140 and will also cause movement of the lower end of the bell crank lever 124 toward the yoke 129, the pin 134 being slideably moveable in slot 128a. Pivotal movement of the bell crank 120 to the position drawn in FIG. 9 and the resulting upward movement of the tie rod 140 and plate 136 and consequent engagement of the lug 138 with clutch plate 114 causes the clutch plate 114 to move away from drive clutch plate 112 to a disengaged position. The clutch plate 114 is freely moveable since it is supported by the yoke 129 and the slot 128a permits pivotal movement of the yoke 129 to the disengaged position when the lower end of the bell crank 120 is in the position shown in FIG. 9.

The extending arm 126 of the bell crank 120 also includes a handle 127 whereby the bell crank 120 can be operated independently of the safety bar 38 by the vehicle operator in the event it is desired that the beaters 16 and the conveyor 12 be stopped. In this manner only the beaters 16 and the conveyor 12 will be stopped without disengagement of the power take off shaft and thus permitting power to be supplied to the conveyor 14.

The shaft 122, which includes an end pivotably supporting the bell crank 120, extends laterally across the forage harvester and includes an opposite end which pivotably supports a handle 127a, rigidly secured to end 123 and swingable through an arc upon rotation of the shaft 122. An extension spring 145 is connected at one end to the handle 125 and at the other end to the side wall of the forage harvester, the spring functioning as an overcenter means for releaseably holding the bell crank 120 in a clutch disengaging position or in a clutch engaging position.

It should also be noted that in the event that the safety bar 38 is caused to pivot about the shaft 39 and the clutch actuating assembly and the safety clutch 42 are caused to disengage, it will be necessary for the operator to return the clutch actuating assembly to its operable position manually. Therefore the operator can first reengage the safety clutch 42 and then engage the beaters and the apron conveyor 12.

RESUME

The present invention thus provides a safety clutch which is a simplified and reliable structure and which includes means for positively securing the clutch components in a declutch position once the safety clutch has been activated to the declutch position. The safety clutch also includes means for providing a positive connection between the drive plate and the driven plate during normal operation and which uses the motions and forces of the drive shaft and rotating drive plate assembly as the motive means for causing declutching. Furthermore, the trip lever is spring biased toward a declutching position such that release of the trip lever results in automatic continuation of the declutching cycle.

The invention also includes a secondary clutch mechanism for controlling the beater drive and the apron conveyor belt drive, and independently operable in the event the safety bar is caused to pivot about its axis to cause actuation of the beater and apron conveyor clutch mechanism thereby stopping the beaters and apron conveyor even if the safety clutch mechanism fails.

The secondary or beater clutch mechanism is also constructed such that it can be manually activated and as a further safety feature, the beater clutch mechanism must be manually reset after the safety clutch mechanism has been reset in order to provide power input to the beaters and conveyor.

We claim:

1. A safety clutch having rotatably driven parts and comprising:
   a drive clutch member;
   means for rotatably mounting said clutch members for rotation about a common axis, said means for rotatably mounting including means for rotatably driving said drive clutch member;
   a drive pin carried by said drive clutch member, said drive pin being rotatable within said drive clutch member and axially movable therein between a drive position in engagement with said driven clutch member for providing a driving connection between said clutch members whereby rotation of said drive clutch member is imparted to said driven clutch member, and a declutch position disengaged from said driven clutch member;
   means for causing axial movement of said drive pin between said drive position and said declutch position, said means for causing axial movement including a camming surface on said drive clutch member, a projection extending outwardly from said drive pin, and means for causing rotation of said drive pin with respect to said drive clutch member, said projection being slideably engagable against said camming surface and being slideably movable with respect to said camming surface upon rotation of said drive pin, for causing axial movement of said drive pin upon rotation of said drive pin.

2. The safety clutch set forth in claim 1 wherein said means for causing rotation of said drive pin includes a trip lever shiftably supported and moveable between a retracted position and an engaging position wherein said trip lever is engageable with said projection for causing rotation of said drive pin, biasing means for biasing said trip lever toward said engaging position, and shiftable latch means operably engageable with said trip lever for releasably holding said trip lever in said retracted position and shiftable between a trip lever engaging position and a release position wherein said trip lever is moveable to said engaging position.

3. The safety clutch set forth in claim 1 further including means for resiliently supporting said drive pin and said projection in said declutch position when said drive pin has been disengaged from said driven clutch member, said means for resiliently supporting including a spring for resiliently biasing said projection against said camming surface and said drive pin in said drive position.

4. The safety clutch set forth in claim 1 wherein said driven clutch member includes a bore therein for axially slideably receiving said drive pin therein when said drive pin is in said drive position.

5. A safety clutch for use in a forage wagon having rotatably driven parts and a support means, the safety clutch comprising:
   a drive clutch member;
   a driven clutch member;
   means on said support means for rotatably mounting said clutch members for rotation about a common axis, said means for rotatably mounting including means for rotatably driving said drive clutch member;
   a drive pin carried by said drive clutch member, said drive pin being rotatable within said drive clutch member and axially movable between a drive position in engagement with said driven clutch member for providing a driving connection between said clutch members whereby rotation of said drive clutch member is imparted to said driven clutch member, and a declutch position disengaged from said driven clutch member;
   means for causing axial movement of said drive pin between said drive position and said declutch position, said means for causing axial movement including a camming surface on said drive clutch member, a projecting pin secured to said drive pin and extending radially outwardly therefrom, said projecting pin being supported against said camming surface and being slideably movable with respect to said camming surface upon rotation of said drive pin, slideable movement of said projecting pin with respect to the camming surface causing axial movement of said drive pin, means for selectively engaging said projecting pin and for causing rotation of said drive pin with respect to said drive clutch member, and means for resiliently biasing said projecting pin against said camming surface and for biasing said drive pin in drive position, and said camming surface including a depression for releasably engaging said projecting pin when said drive pin is moved to said declutch position.

6. The safety clutch set forth in claim 5 wherein said means for causing rotation includes a trip lever shiftably supported by said support means and moveable between a retracted position and an engaging position wherein said trip lever is engageable with said projecting pin for causing rotation of said drive pin, biasing means for biasing said trip lever toward said engaging position, and shiftable latch means operably engageable with said trip lever for releasably holding said trip lever in said retracted position and shiftable between a trip lever engaging position and a release position wherein said trip lever is moveable to said engaging position.

7. The safety clutch set forth in claim 5 wherein said means for rotatably mounting said clutch members includes a drive shaft, said drive clutch member being secured to said drive shaft for rotation with said drive shaft, and said driven clutch member being freely rotatably supported on said drive shaft when said drive pin is in said declutch position.

8. The safety clutch set forth in claim 5 wherein said driven clutch member includes at least one bore for axially slideably receiving said drive pin therein when said drive pin is in said drive position.

* * * * *